May 14, 1957  M. J. LIESER  2,792,020
PISTON ACTUATED SUPPLY AND EXHAUST VALVE
Filed July 21, 1955
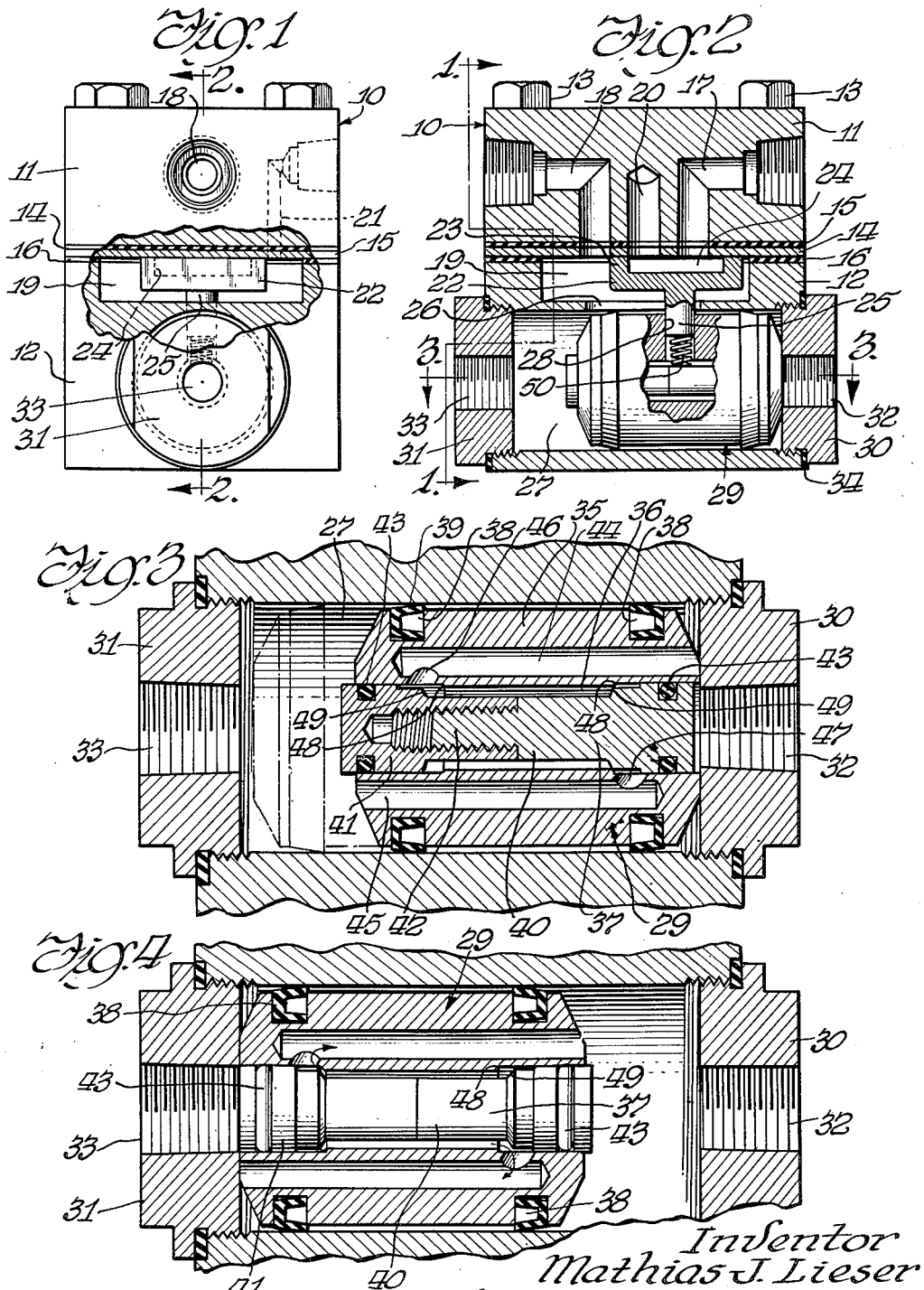
Inventor
Mathias J. Lieser
by Dawson Tilton & Graham
Attorneys

United States Patent Office 2,792,020
Patented May 14, 1957

2,792,020

PISTON ACTUATED SUPPLY AND EXHAUST VALVE

Mathias J. Lieser, Chicago, Ill., assignor to Mead Specialties Company, Inc., Chicago, Ill., a corporation of Illinois Application July 21, 1955, Serial No. 523,502

5 Claims. (Cl. 137—620)

This invention relates to a control valve, and more particularly to a slide valve structure wherein the reciprocatory movement of a piston within a cylinder carries a valve between alternate positions to thereby establish selective interconnection between a plurality of flow passages within the structure. The device is useful in many environmental settings, and is especially suited for use as a control device enabling small pressure differentials to be utilized to change the flow paths of high pressure fluids.

This application is a continuation-in-part of my copending patent application, Serial No. 411,660, filed February 23, 1954.

Slide valve structures of the type herein considered are generally known in the art, and an improved valve structure of this character is described in my copending patent application identified above. These valve structures comprise a valve chest usually provided with four flow passages therethrough—one being an inlet for pressure fluid, another an exhaust passage, and the remaining two flow passages being arranged for selective communication alternately with the inlet and exhaust passages. A slide valve is provided for selectively connecting first one and then the other of the controlled flow passages to the inlet and exhaust passages, and when one is connected to the inlet the other is at the same time connected to the exhaust passage.

The slide valve is moved between its alternate positions by a piston that reciprocates within a cylinder communicating at opposite ends with a source of pressure fluid. The piston is reciprocated by creating a pressure differential between opposite ends of the cylinder, either by increasing the pressure at one end thereof while maintaining the pressure at the opposite end constant, or by reducing the pressure at one end of the cylinder while maintaining the pressure constant at the opposite end.

In these structures a small bleed passage is provided in the piston so that after a change in pressures between the opposite ends of the cylinder, the pressures will ultimately be equalized through the bleed passage. A serious problem has been presented in structures of this type due to the difficulty in providing a bleed passage of the precise requisite diameter. If the bleed passage is too large it is difficult to establish a pressure differential between opposite ends of the cylinder that will bring about rapid movement of the piston. On the other hand, if the passage is too small or if it becomes blocked by dirt etc., which is likely in any event because the passage is small, there is no equalization of the pressures at opposite ends of the cylinder after movement of the piston, from which two consequences follow. The first is that response of the piston is relatively slow, because before the piston can be moved the low pressure end of the cylinder must first be brought out to the same pressure as the opposite end thereof which takes a considerable period of time, especially because the cylinder is connected to a source of pressure fluid through relatively long hoses. Secondly, the piston will bounce upon impact with each end of the cylinder.

While the valve structures having all of these shortcomings provide in general acceptable results and are presently in commercial use, there are many situations where such valves do not provide satisfactory results, and there is a need then for an improved type of slide valve structure (sometimes referred to in the art as 3-way or 4-way type valves). It is, accordingly, an object of this invention to provide a slide valve structure that will afford substantially improved results over the slide valves heretofore available.

Another object of the invention is to provide a slide valve in which relatively rapid movement of the piston is provided along with substantially instantaneous response of the piston to a pressure change at the ends of the cylinder, and in which the piston moves into abutment with the cylinder ends with substantially no bounce associated therewith. A further object of the invention is in the provision of a valve structure of the character described wherein a piston carries a slide valve between alternate positions, and in which the piston comprises an outer piston section or female shuttle and an inner piston section or male shuttle that is reciprocable within a longitudinally extending bore or opening provided centrally through the outer piston section, the bleeding of fluid through the piston being determined by the location of the inner piston section with respect to the outer piston section.

Yet a further object is to provide a piston or shuttle assembly as described having oppositely oriented flow passages in the outer piston section communicating at their outer ends with opposite end portions of the cylinder, and at their inner ends with the bore through the outer piston section—the inner piston section functioning as a valve to selectively open and close off one or the other of the flow passages, or to permit the flow of air or fluids through each, the inner piston section being moved with respect to the outer piston section by the pressure differential between opposite end portions of the cylinder, and also being moved with respect to the outer piston section by impact with the end closures of the cylinder, the flow passages being generally analogous in function to the bleed openings through the pistons of prior art devices. Additional objects and advantages will become apparent as the specification developes.

An illustrative embodiment of the invention is shown in the accompanying drawing, in which:

Figure 1 is a vertical view partly in section of a control valve structure embodying the invention, and being taken along the line 1—1 of Figure 2; Figure 2 is a longitudinal sectional view of the valve structure taken along the line 2—2 of Figure 1; Figure 3 is a longitudinal sectional view taken along the line 3—3 of Figure 2; and Figure 4 is a longitudinal sectional view similar to that of Figure 3, but showing the piston assembly in an alternate position.

Illustrated in the drawing is a valve structure designated generally with the numeral 10 that is of the slide valve type, and the specific valve illustrated is a 4-way slide valve. The valve structure 10 comprises a valve chest or upper casing section 11 and a lower casing section 12. The casing sections are secured together by means of cap screws 13. Interposed between the sections 11 and 12 is a wear plate 14 faced on each side with gaskets 15 and 16. The wear plate 14 may be considered as part of the chest or upper section 11, and is provided for the reason that it offers greater wear resistance than does the material from which the casing sections 11 and 12 are formed, but since the material from which it is formed is considerably more expensive it is desirable to provide a relatively small wear plate in preference to constructing the entire valve casing from such material. The wear plate 14 might be made of stainless steel, but preferably is formed from one of the materials having generally the properties of stainless steel, but possessing the additional property of being adapted to be hardened, such materials being well known in the art.

The chest or upper casing section 11 is provided with a plurality of flow passages therein, each of which has at its outer end a tapped fitting opening that enables the passage to be connected to a fluid flow conduit. The passages 17 and 18 shown in Figure 2 may be considered controlled flow passages, and communicate through the wear plate 14 with a valve chamber 19. The passage 20 seen in Figure 2 is an exhaust passage, while the flow passage 21 shown in Figure 1 is a pressure inlet passage. Both of the passages 20 and 21 communicate through the wear plate with the chamber 19.

Mounted for slidable movement against the wear plate 14 within the limits defined by the valve chamber is a slide valve 22 having a perimetric lip 23 that bears upwardly against the wear plate 14, and a central recess or chamber 24 that, as is shown in Figure 2, is adapted to establish communication between the exhaust passage 20 and one of the controlled passages 17 or 18, depending upon the particular end of the chamber 19 at which the valve is positioned.

The slide valve 22 is equipped with a depending stem 25 that is slidable through an elongated recess or opening 26 communicating with the valve chamber 19, and also with a cylinder 27 provided by the lower valve casing 12. The stem 25 is received within a transverse bore 28 provided in a piston 29 that is mounted for reciprocatory movement within the cylinder 27. The piston 29 in its reciprocatory movement from end to end of the cylinder 27 carries the slide valve 22 therewith and alternately establishes communication between the exhaust passage and controlled passages 17 and 18, while at the same time the inlet passage 21 communicates respectively with the controlled passages 18 and 17.

The cylinder 27 at each end thereof is equipped with internal threads that threadedly receive the cylinder end walls 30 and 31, each of which is provided with a threaded opening or port 32 and 33, respectively, therein that are adapted to be connected to the fittings of fluid flow conduits. Preferably, a gasket 34 is interposed between the cylinder end walls and lower casing section 12 to establish a fluid-tight seal therebetween.

Referring now to Figures 3 and 4 in particular, it is seen that the piston 29 is in effect a piston assembly that includes an outer piston section or female shuttle 35 having a bore 36 extending longitudinally therethrough, and an inner piston section or male shuttle 37 slidable within the bore 36 to establish a sealing relation between outer piston section 35 and walls of the cylinder 27. The outer piston section is provided adjacent each end thereof with a circumferential recess 38, each of which has an annular sealing member or sealing cup 39 mounted therein. The male shuttle 37 is formed of two shuttle segments 40 and 41—the latter being provided with an internally threaded opening extending longitudinally therein, and the former being provided with an externally threaded stem 42 that is threadedly received within the threaded opening of the segment 41. Adjacent each end the male shuttle 37 is provided with an annular channel that receives an O-ring 43 that establishes a sealing relation between the male shuttle 37 and walls of the bore 36.

The outer piston section 35 is provided with oppositely oriented flow passages 44 and 45 extending longitudinally therein in generally parallel relation with the bore 36. The passage 44 at the outer end thereof is in open communication with the end portion of the cylinder adjacent the end wall 30. The passage 45 at its outer end communicates with the end portion of the cylinder adjacent the end wall 31. At its inner end the passage 44 is in open communication through a port 46 with the bore 36; and similarly, the passage 45 communicates with the bore 36 through a port 47. The ports 46 and 47 are adapted to be selectively closed or to both be opened, depending upon the position of the inner piston section 37 within the bore 36, by cooperative valve arrangements provided between the piston sections adjacent the ends thereof.

The valves are provided by coacting annular shoulders 48 provided by the outer piston section between the enlarged end portions of the bore 36 and restricted central portion thereof, and complementary annular shoulders 49 provided by the inner piston section 37 between the restricted central portion thereof and the stepped end portions. The shoulders 48 and 49 are adapted to be brought into abutment and thereby form a closure or valve that interrupts communication between the respective flow passages 44 and 45 and bore 36, and at the same time act to constrain or limit relative movement between the inner piston section and outer piston section.

Referring again to Figure 2, it is seen that the slide valve 22 is biased upwardly against the wear plate 14 by a coil spring 50 that seats at one end against the stem 25 and at its other end against the inner piston section 37. The loose fit is provided between the stem 25 and transverse bore 28 so that pressure fluid within the valve chamber 19 can flow downwardly through the passage 28 and into the bore 36 through the outer piston section.

Operation

Following through a cycle of operation, reference will first be made to Figure 3 which shows the piston assembly 29 positioned in the end portion of the cylinder 27 adjacent the end closure wall 30 thereof. As has been brought out before, the piston assembly in its entirety is reciprocable within the limits defined by the end walls 30 and 31 within the cylinder 27, and the inner piston section 37 is shiftable or reciprocable in the bore 36 within the limits defined by the shoulders 48 of the outer piston section.

It is seen in Figure 3 that the outer piston section 35 abuts the end closure wall 30 and the inner piston 37 is shifted to the left to the point wherein the shoulders 48 and 49 at the right end portion of the piston sections are in abutment with each other. This condition is brought about following the establishment of a pressure differential between the opposite ends of the cylinder, or specifically at the ports 32 and 33. More pointedly, the pressure differential is such that a higher pressure is present at the port 32 than at the port 33. This condition is brought about either by reducing the normal pressure at the port 33, or by increasing the normal pressure at the port 32. It may here be pointed out that during an operational period, pressure of some predetermined value will be applied to the ports 32 and 33. For example, the pressure at each port may be 100 pounds per square inch. Further, control valve assemblies of this type are designed to function on low pressure differentials and, for example, a difference of presssure of about five pounds between the end portions of the cylinder will be sufficient to bring about movement of the piston assembly from one end to the other of the cylinder in a manner about to be described.

In the position of the valve assembly as it is illustrated in Figure 3, a pressure differential has already been established between the ports 32 and 33 with the result that the inner piston section 37 has shifted to the left whereby the shoulders 48 and 49 have been brought into abutting relation to close off the flow passage 44 and passage 45 connected thereto. However, the shoulders 48 and 49 adjacent the left end of the piston assembly are spaced apart whereby the passage 44 communicates through the flow passage 46 with the bore 36. The pressure differential between opposite ends of the cylinder is further effective to commence movement of the entire piston assembly toward the left, and ultimately into the position shown by dotted lines in Figure 3. As a result of the communication between the passage 44 and bore 36, and because the bore 36 communicates with the valve chamber 19 (Figure 2), pressure fluid within the valve chamber 19 flows into the bore 36, outwardly through the passage 44 and, since it is at a pressure at least as high as the pressure normally present at the ports 32 and 33, it implements or augments the pressure acting on the piston assembly to force it toward the left, and thereby aids in the movement of the piston assembly.

Ultimately in its movement toward the end wall 31 of the cylinder, the inner piston section 37 abuts the end wall about the opening 33, as is shown most clearly in Figure 4, and movement of the inner piston section is thereby terminated. However, the pressure differential still acting against the outer piston section causes its movement to continue to the left until it abuts the end walls 31, as is shown in Figure 4. However, during the final stages of movement of the outer piston section 35, the fluid being compressed between it and the end wall 31 serves to cushion the impact of the outer piston section, and it abuts the wall 31 without appreciable bounce and, in effect, all movement tends to stop with both the inner and outer piston sections abutting the end wall 31, as shown in Figure 4.

It will be appreciated that the piston sections upon abutment thereof with the wall 31 have shifted with respect to each other, and have moved into a condition of balance wherein the shoulders 48 and 49 at each end of the piston assembly are spaced from each other, with the result that both of the flow passages 44 and 45 are in open communication with the bore 36. Consequently, pressure fluid within the chamber 19 flowing downwardly through the passage 28 (Figure 2) flows through the bore 36, passages 44 and 45 and into opposite end portions of the cylinder 27. Quickly, a condition of pressure equality is established, and the pressure fluid flowing through the passage 45 leaks by the ends of the piston sections and into the port 33 and the pressure fluid line connected thereto. This balanced condition is then maintained until a further pressure differential is developed, ordinarily by a slight reduction in the pressure at the port 32.

When this occurs, the inner piston section 37 shifts to the right until the shoulders 48 and 49 at the left end of the assembly are brought into abutting engagement to substantially seal off the flow passage 44 from the bore 36, or, in other words, into a position complementary to that illustrated in Figure 3. The piston assembly in its entirety will be moved to the right and into a position of abutment with the end wall 30 that is identical with that shown in Figure 4, except at the opposite end of the cylinder.

It will be clear that the movement of the piston assembly from one end to the other of the cylinder carries the slide valve 22 from one end to the other of the valve chamber 19, so at one time the passages 17 and 20 are in communication with each other as are the passages 18 and 21, while at another time the passages 18 and 20 communicate with each other through the recess 24 in the slide valve, and the passages 17 and 21 communicate with each other through the chamber 19. The spring 50 functions to urge the slide valve into sealing engagement with the wear plate 14 and the wear plate, since it has good wear-resistant qualities and is substantially non-corrosive, is able to withstand for long periods the frictional engagement of the slide valve. When the wear plate becomes worn, it may be readily replaced without the necessity of replacing other elements of the valve structure.

In the arrangement that has been described, bounce which is undesirable and heretofore has been caused by impact of the piston with the end walls of the cylinder is substantially eliminated. Further, rapid response of the piston is brought about upon the initiation of a pressure differential between the opposite ends of the cylinder, since prior to the establishment of such a pressure differential a condition of pressure balance has been created. Moreover, the piston assembly moves rapidly from one end to the other of the cylinder because during the period of movement there is no leakage of pressure fluid through the piston assembly to the end of the cylinder having a lower pressure, as has been the case heretofore where a single bleed has been provided. In addition, the leakage of pressure fluid into the bore 36 from the valve chamber 19 is utilized to implement movement of the piston assembly as well as to create a condition of pressure balance. It may also be noted that when the inner piston section and outer piston section are in the position shown in Figure 4, that the flow passages 44 and 45 communicate with each other, and since these flow passages are all quite large a rapid equalization of pressure takes place across the piston assembly.

While in the foregoing specification an embodiment of the invention has been described in considerable detail for purposes of illustration, it will be apparent to those skilled in the art that substantial changes may be made in these details without departing from the spirit and principles of the invention.

I claim:

1. In a slide valve structure of the character described having upper and lower casing sections, the upper section being provided with a valve chamber and a plurality of flow passages communicating therewith, the lower being provided with a cylinder and a piston assembly reciprocable therein, a slide valve movable within said valve chamber and being carried by said piston assembly, said piston assembly comprising an outer piston casing slidable within said cylinder and having a bore extending longitudinally therethrough, an inner piston section reciprocable within said bore and being in sealing engagement therewith adjacent its ends, said outer piston section having oppositely oriented passages extending longitudinally therein communicating at their inner ends with said bore and at their respective outer ends with opposite end portions of said cylinder, said inner and outer piston sections providing adjacent each end thereof cooperating shoulders adapted to provide abutments constraining movement of said inner piston section between the limits defined thereby and also providing valves for interrupting the communication between said bore and the respective longitudinal flow passages, and a transversely extending passage in said outer piston section adapted to receive a portion of said slide valve therein and providing communication between said valve chamber and said bore, said inner piston section being adapted to provide either selective or simultaneous communication, depending upon its position within said bore, between said bore and the longitudinally extending flow passages.

2. The structure of claim 1 in which a wear plate having non-corrosive properties and good resistance to wear is carried between said casing sections and is slidably engaged by said slide valve.

3. The structure of claim 1 in which said inner piston section is reduced in cross section through the central portion thereof and in which the diameter of said bore is reduced through the central portion thereof, said cooperating shoulders being provided at the points of integration between the reduced and enlarged sections of said bore and said inner piston section.

4. In a slide valve structure, a casing providing a valve chamber and a plurality of flow passages communicating therewith and providing also a cylinder and a piston assembly reciprocable therein, a slide valve movable within said valve chamber and being carried by said piston assembly, said piston assembly comprising an outer piston casing slidable within said cylinder and having a bore extending longitudinally therethrough, an inner piston section reciprocable within said bore and being in sealing engagement therewith adjacent its ends, said outer piston section having oppositely-oriented passages extending longitudinally therein communicating at their inner ends with said bore and at their respective outer ends with opposite end portions of said cylinder, said inner and outer piston sections providing adjacent each end thereof cooperating shoulders providing valves for interrupting the communication between said bore and the respective longitudinal flow passages, said outer piston section being provided with a transversely-extending passage providing communication between said valve chamber and said bore, said inner piston section being adapted to provide either selective or simultaneous communication, depending upon its position within said bore, between said bore and the longitudinally-extending flow passages.

5. The structure of claim 4, in which said transverse passage in the outer piston receives in a loose fitting the stem portion of said slide valve.

References Cited in the file of this patent
UNITED STATES PATENTS

| | | |
|---|---|---|
| 2,131,075 | Sanford | Sept. 27, 1938 |
| 2,616,449 | Maha | Nov. 4, 1952 |
| 2,711,797 | Muller | June 28, 1955 |